No. 780,503. PATENTED JAN. 24, 1905.
R. P. JACKSON.
CONTROLLER FOR ALTERNATING CURRENT ELECTRIC MOTORS.
APPLICATION FILED JUNE 6, 1904.
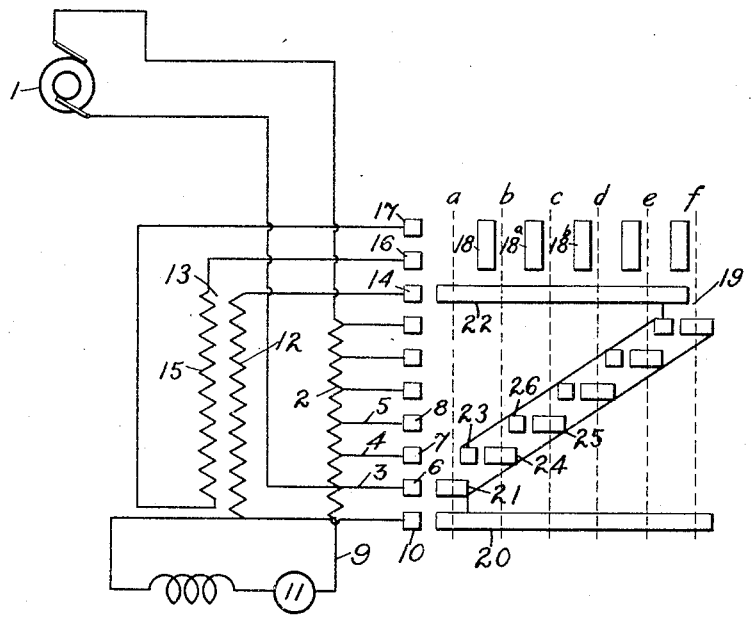
WITNESSES:
Fred H. Miller
Otto S. Schauer
INVENTOR
Ray P. Jackson
BY
Wesley G. Carr
ATTORNEY No. 780,503.　　　　　　　　　　　　　　　　　　　Patented January 24, 1905.

UNITED STATES PATENT OFFICE.

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROLLER FOR ALTERNATING-CURRENT ELECTRIC MOTORS.

SPECIFICATION forming part of Letters Patent No. 780,503, dated January 24, 1905.

Application filed June 6, 1904. Serial No. 211,373.

*To all whom it may concern:*

Be it known that I, RAY P. JACKSON, a citizen of the United States, and a resident of Wilkinsburg, in the county of Allegheny and State of Pennsylvania, have invented a new and useful Improvement in Controllers for Alternating-Current Electric Motors, of which the following is a specification.

My invention relates to controllers for electric motors which are operated by means of alternating-current energy; and it has for its object to provide means for reducing and preventing arcing between the circuit making and breaking contact-surfaces and consequent injuries thereto.

The speeds of alternating-current motors may be varied by varying the voltages applied to them, and this is commonly done by varying the active lengths of the windings of the transformers from which the motors are supplied with energy. In the operation of controllers which are employed for varying the active lengths of such transformer-windings the motor-circuits are broken at each variation step in the voltage or portions of the main transformer-windings are temporarily short-circuited and dangerous and destructive arcs are usually produced when either of these changes takes place. Another difficulty which has been experienced in the construction of controllers for the purpose described has been due to the fact that in passing from higher-voltage steps to lower-voltage steps the arcing may be very serious, while that occurring when passing from lower-voltage steps to higher-voltage steps may be of comparatively little consequence.

My invention provides means for controlling motors in substantial accordance with the method described, but which avoids dangerous and destructive arcing between the parts of the controller which make and break contact with each other regardless of whether the controller is operated to supply increasing or decreasing voltages to the translating devices and is illustrated in the single figure of the accompanying drawing.

Single-phase alternating-current energy is supplied from a suitable source 1 to a main autotransformer-winding 2, which is subdivided by means of leads 3 4 5, &c., respectively provided with contact-terminals 6 7 8, &c. If desired, however, a two-winding transformer may be employed instead of the autotransformer-winding 2, the secondary winding being subdivided by means of leads in a manner similar to that here shown for the autotransformer-winding. Connected between terminal 9 of the main transformer and contact-terminal 10 is a motor 11 or any other suitable translating device or devices to which it is desired to supply variable voltages. The primary winding 12 of an auxiliary transformer 13 is connected between contact-terminals 10 and 14, and the terminals of the secondary winding 15 are respectively connected to contact-terminals 16 and 17, which are adapted to be short-circuited temporarily and at the proper moments by means of conducting-strips 18 $18^a$ $18^b$, &c., mounted upon a controller-drum 19.

In position $a$ of the controller-drum 19 (here shown in development) drum-segments 20, 21, and 22, respectively, engage with contact-fingers 10, 6, and 14 and energy is supplied to the motor 11 through a circuit which includes that portion of the main transformer-winding 2 which is between terminal 9 and lead 3, contact-finger 6, and drum-segments 21 and 20.

If the controller-drum 19 is moved to the position $b$, contact-finger 7 first engages drum-segment 23 and the portion of the main transformer-winding 2 included between the points of connection therewith of the leads 3 and 4 is short-circuited through the primary winding 12 of the auxiliary transformer 13, but remains short-circuited only an instant, since segment-ring 21 and contact-finger 6 are immediately disengaged from each other. Immediately thereafter conducting-strip 18 engages with contact-fingers 16 and 17 and short-circuits the secondary winding 15 of the transformer 13. When the contact-terminal 6 becomes disengaged from the drum-segment 21, very little sparking occurs, since only a local circuit is interrupted and the winding 12 serves to choke down the amount of current. The operation of the controller is similar for the succeeding positions of the drum.

If the controller-drum 19 is in the position $c$ and it is desired to impress a lower voltage upon the motor 11, it is necessary to return to the position $b$, and in doing so conducting-strip $18^a$ first engages with contact-fingers 16 and 17, thereby short-circuiting the secondary winding 15. Then when contact-terminal 8 is disengaged from drum-segment 25 and immediately thereafter engages drum-segment 26 comparatively little sparking occurs between the said parts, since the impedance of the winding 12 is temporarily neutralized by the short-circuiting of winding 15. Similarly comparatively little sparking occurs after the drum-segment 24 has engaged with contact-finger 7 and the drum-segment 26 is disengaged from the contact-finger 8, since the local current is choked down by the impedance of the winding 12.

While I have shown a single motor only, it will be understood that a plurality of motors or other suitable translating devices may be employed and that they may be connected either in series or in parallel relation.

I claim as my invention—

1. The combination with a source of alternating-current energy, a subdivided main transformer-winding connected thereto, a translating device having a terminal connected to said winding and means for connecting the other terminal to the points of subdivision of the main transformer-winding, of an auxiliary transformer comprising primary and secondary windings, the former of which has one terminal connected to a terminal of said translating device, means for connecting the other terminal to points of subdivision of the main transformer-winding and means for connecting together the terminals of the said secondary winding.

2. The combination with a source of variable-voltage alternating-current energy, a translating device having a terminal connected to said source and means for connecting the other terminal to points connected with said source and differing in voltage from each other and from the point to which the other terminal is connected, of an auxiliary transformer comprising primary and secondary windings the former of which is connected to a terminal of said translating device, means for connecting the other terminal to points connected with said source and differing in voltage, and means for connecting together the terminals of the said secondary winding.

In testimony whereof I have hereunto subscribed my name this 27th day of May, 1904.

RAY P. JACKSON.

Witnesses:
H. B. MYER,
BIRNEY HINES.